United States Patent
Tsukahara (10) Patent No.: US 7,178,058 B2
(45) Date of Patent: Feb. 13, 2007

(54) FAULT TOLERANT COMPUTER AND TRANSACTION SYNCHRONIZATION CONTROL METHOD

(75) Inventor: Katsumi Tsukahara, Yamanashi (JP)

(73) Assignee: NEC Corporation, Tokyo (JP)

( * ) Notice: Subject to any disclaimer, the term of this patent is extended or adjusted under 35 U.S.C. 154(b) by 516 days.

(21) Appl. No.: 10/650,667

(22) Filed: Aug. 29, 2003

(65) Prior Publication Data
US 2004/0153756 A1    Aug. 5, 2004

(30) Foreign Application Priority Data
Aug. 30, 2002    (JP) ............... 2002-255388

(51) Int. Cl.
*G06F 11/00*    (2006.01)
(52) U.S. Cl. .......................... 714/12; 714/11
(58) Field of Classification Search .............. 714/11, 714/12
See application file for complete search history.

(56) References Cited

U.S. PATENT DOCUMENTS 5,226,152 A * 7/1993 Klug et al. ............... 714/12
5,398,331 A * 3/1995 Huang et al. ............ 714/12
6,691,225 B1 * 2/2004 Suffin .................... 713/2

FOREIGN PATENT DOCUMENTS

JP    11-338832 A    12/1999

\* cited by examiner

*Primary Examiner*—Robert Beausoliel
*Assistant Examiner*—Charles Ehne
(74) *Attorney, Agent, or Firm*—Sughrue Mion, PLLC (57) ABSTRACT

A fault tolerant computer includes a plurality of CPU modules that process the same instruction string while maintaining clock synchronization; and a plurality of I/O modules each having a plurality of device controllers executing input/output control processing for a device. A transaction synchronization controller, which checks if the sequences of I/O transactions issued from the plurality of CPU modules match, is provided in each device controller. If the sequences of I/O transactions issued from the plurality of CPU modules to each device controller match, a judgment is made that an out-of-synchronization condition is not caused.

20 Claims, 7 Drawing Sheets

FAULT TOLERANT COMPUTER AND TRANSACTION SYNCHRONIZATION CONTROL METHOD

BACKGROUND OF THE INVENTION

1. Field of the Invention

The present invention relates to a lockstep fault tolerant computer that simultaneously processes the same instruction strings in a plurality of clock-synchronized computer modules therein, and more particularly to a fault tolerant computer and its transaction synchronization control method that accept a time lag in I/O transactions issued from the plurality of CPU modules to I/O modules.

2. Description of the Related Art

A conventional fault tolerant computer that simultaneously processes the same instructions in a plurality of clock-synchronized computer modules therein comprises a plurality of CPU modules and a plurality of I/O modules. Each I/O module has a comparator that checks if the operation of the plurality of CPU modules synchronizes each other. When the I/O modules receive the same I/O transactions from all CPU modules at the same time, the comparator judges that the CPU modules are in synchronization, that is, the CPU modules do not fail and the I/O modules execute I/O processing. A conventional fault tolerant computer guarantees that synchronization is maintained unless the comparator judges that the CPU modules fail.

However, as the speed of processors has increased recently, an out-of-synchronization condition occurs. This is because the recent high-speed processors installed in the CPU modules do not fully synchronize with each other even if the CPU modules receive the same clock. This sometimes results in an I/O module finding a time difference in the I/O transactions issued from the plurality of CPU modules.

For such an out-of-synchronization condition, it is known that the program operations are the same. However, the conventional fault tolerant computer sometimes enters the CPU module fallback condition or executes re-installation operation in that case although the CPU modules do not fail.

As described above, one of the problems with the conventional fault tolerant computer is that, when an I/O module finds a time difference in the I/O transactions issued from the plurality of CPU modules, the fault tolerant computer enters the CPU module fallback condition or executes re-installation operation even when the cause of the out-of-synchronization condition was not a failure. This, in turn, reduces the MTBF (Mean Time Between Failure: average time from a computer system failure to the next failure) of a fault tolerant computer and thus reduces the advantage of a fault tolerant computer.

Many technologies have been proposed conventionally for solving an out-of-synchronization condition among a plurality of processors. For example, Japanese Patent Laid-Open Publication No. Hei 11-338832 discloses a method in which the inter-processor bus data transfer start signal and end signal are used by the active processor and the standby processor to wait for the delayed processing of the standby processor for quickly establishing synchronization between them. However, those technologies differ from the technology according to the present invention in that the technology according to the present invention accepts a time delay in I/O transactions received by each I/O controller.

SUMMARY OF THE INVENTION

In view of the foregoing, it is an object of the present invention to provide a fault tolerant computer and a transaction synchronization control method that minimize a condition, in which a CPU module fallback operation or a re-installation operation is executed by an out-of-synchronization condition that is not a failure, and that accept an out-of-synchronization condition of processors within a predetermined range.

To achieve the above object, a fault tolerant computer according to the present invention comprises a plurality of CPU modules processing the same instruction string while maintaining clock synchronization; a plurality of I/O modules each having a plurality of device controllers each executing input/output control processing for a device; and a transaction synchronization controller, provided in each of the device controllers, that checks if sequences of I/O transactions issued from the plurality of CPU modules match and, if the sequences match, judges that an out-of-synchronization condition is not caused.

In accordance with a fault tolerant computer according to the present invention, the transaction synchronization controller comprises timer means for measuring a predetermined time; and comparison means for checking if the sequences of I/O transactions, issued from the plurality of CPU modules, match on a device controller basis while waiting for the predetermined time.

In accordance with a fault tolerant computer according to the present invention, the transaction synchronization controller further comprises an output controller that outputs the I/O transactions to the device controller when the sequences match.

In accordance with a fault tolerant computer according to the present invention, the output controller outputs the matching I/O transactions to the device controller, one at a time, when the I/O transactions from the CPU modules match.

In accordance with a fault tolerant computer according to the present invention, the transaction synchronization controller comprises a plurality of storage means in which the I/O transactions issued from the plurality of CPU modules are stored; comparison means for comparing the sequences of I/O transactions stored in the storage means; and timer means for measuring the predetermined time.

In accordance with a fault tolerant computer according to the present invention, the transaction synchronization controller further comprises a plurality of storage means in which the I/O transactions issued from the plurality of CPU modules are stored.

In accordance with a fault tolerant computer according to the present invention, the transaction synchronization controller further comprises selection circuits that select between the plurality of storage means and the CPU modules as a source from which I/O transactions to be sent to the comparison means are received.

According to the present invention, even if an out-of-synchronization condition occurs in a plurality of CPU modules and therefore an I/O transaction is not issued to an I/O controller in an I/O module in the same timing step, the sequences of I/O transactions are checked on an I/O controller basis and, if the sequences match within a predetermined time, the out-of-synchronization condition is judged as a condition not caused by a failure and the I/O transactions are output to the I/O controller. This configuration minimizes a condition in which a CPU module fallback operation or a re-installation operation is executed by an out-of-synchronization condition that is not a failure and, thus, accepts an out-of-synchronization condition of processors within a predetermined range.

DETAILED DESCRIPTION OF THE PREFERRED EMBODIMENTS

Figure 1:
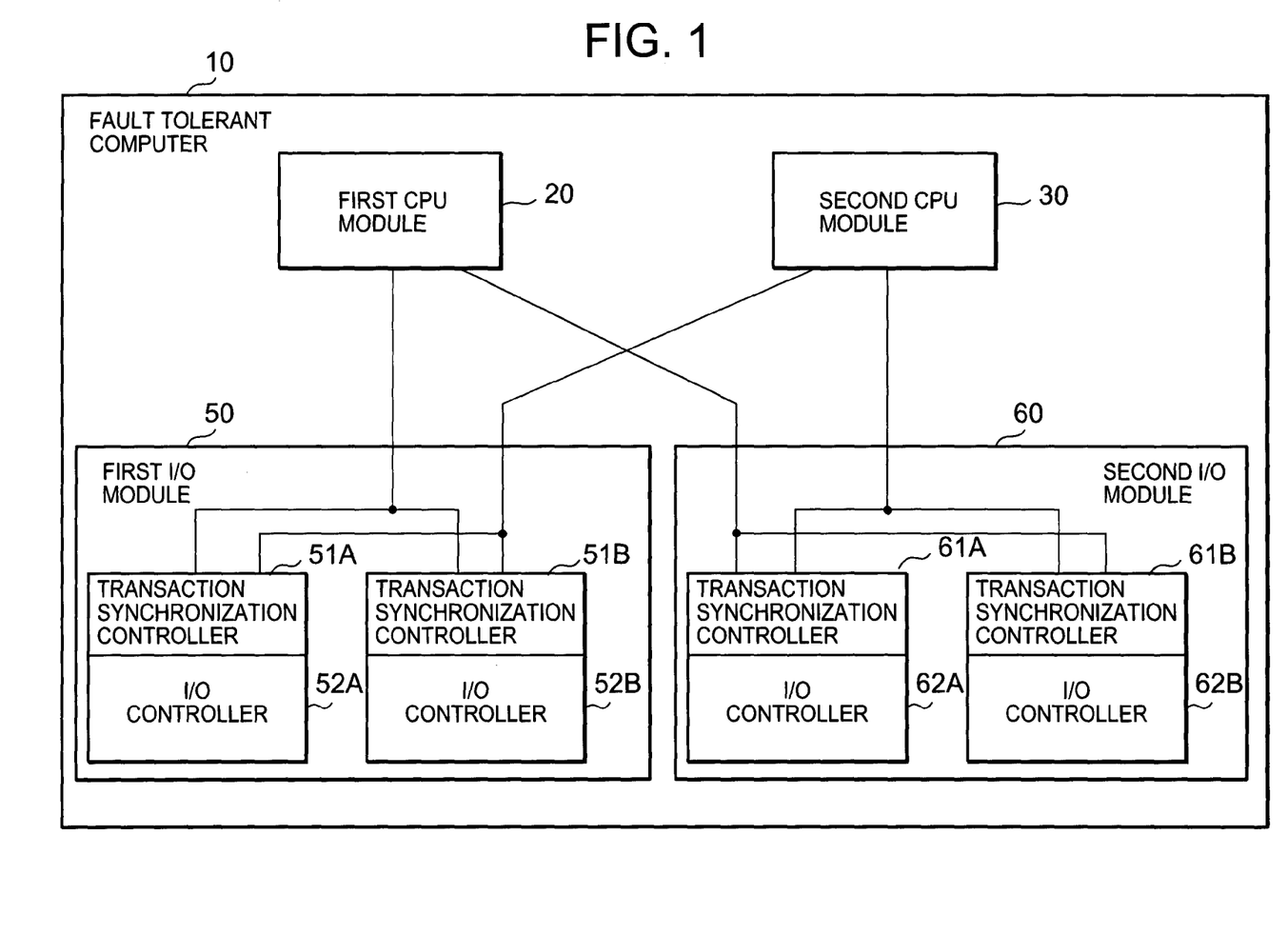
FIG. 1 is a block diagram showing the configuration of a fault tolerant computer in an embodiment of the present invention.

An embodiment of the present invention will be described in detail below with reference to the drawings. FIG. 1 is a block diagram showing the configuration of a fault tolerant computer in an embodiment of the present invention.

Referring to FIG. 1, a fault tolerant computer 10 in this embodiment comprises a plurality of CPU modules 20 and 30. The CPU modules 20 and 30 are clock-synchronized with each other to simultaneously process the same instruction string. The fault tolerant computer 10 in this embodiment compares the processing results of the CPU modules and, even if one of the CPU modules fails, allows the remaining CPU modules to continue processing. Each of the CPU modules 20 and 30 comprises one or more processors, a processor external bus, and a memory. FIG. 1 shows only the configuration characteristic of this embodiment but omits the other general configuration.

The fault tolerant computer 10 comprises a first I/O module 50 and a second I/O module 60. The first I/O module 50 and the second I/O module 60 are each connected to the CPU modules 20 and 30.

The first and second CPU modules 20 and 30 operate on the same clock and issue I/O transactions to the first and second I/O modules 50 and 60.

The first and second I/O modules 50 and 60 each have two I/O controllers 52A, 52B and 62A, 62B, respectively. The first and second I/O modules 50 and 60 in this embodiment also have transaction synchronization controllers 51A, 51B and 61A, 61B, respectively, for each I/O controller.

Devices such as network controllers or disk controllers are connected to the I/O controllers 52A, 52 B and 62A, 62B. The I/O controllers 52A, 52B and 62A, 62B execute I/O control processing for those devices according to I/O transactions.

The transaction synchronization controllers 51A, 51B, 61A, and 61B check the I/O transactions from the first and second CPU modules 20 and 30 if their sequences match for each of the corresponding I/O controllers. Here, the sequence means a sequence of actions of a plurality of I/O transactions. The transaction synchronization controllers 51A, 51B, 61A, and 61B in this embodiment allow the same transaction to be received at different times even if there is a delay in time. That is, even if an I/O transaction is received at different times, the transaction synchronization controllers wait for a predetermined time and, if a match occurs in the I/O transactions received within the predetermined time, the sequences are treated as a match. If an I/O transaction is received only from one of the CPU modules within the predetermined time, the sequences are treated as a mismatch. If the same I/O transactions are received but in different orders, the sequences are treated also as a mismatch. When a sequence match is detected, the transaction synchronization controllers 51A, 51B, 61A, and 61B output I/O transactions to the I/O controllers 52A, 52B, 62A, and 62B corresponding to the devices.

Figure 4:
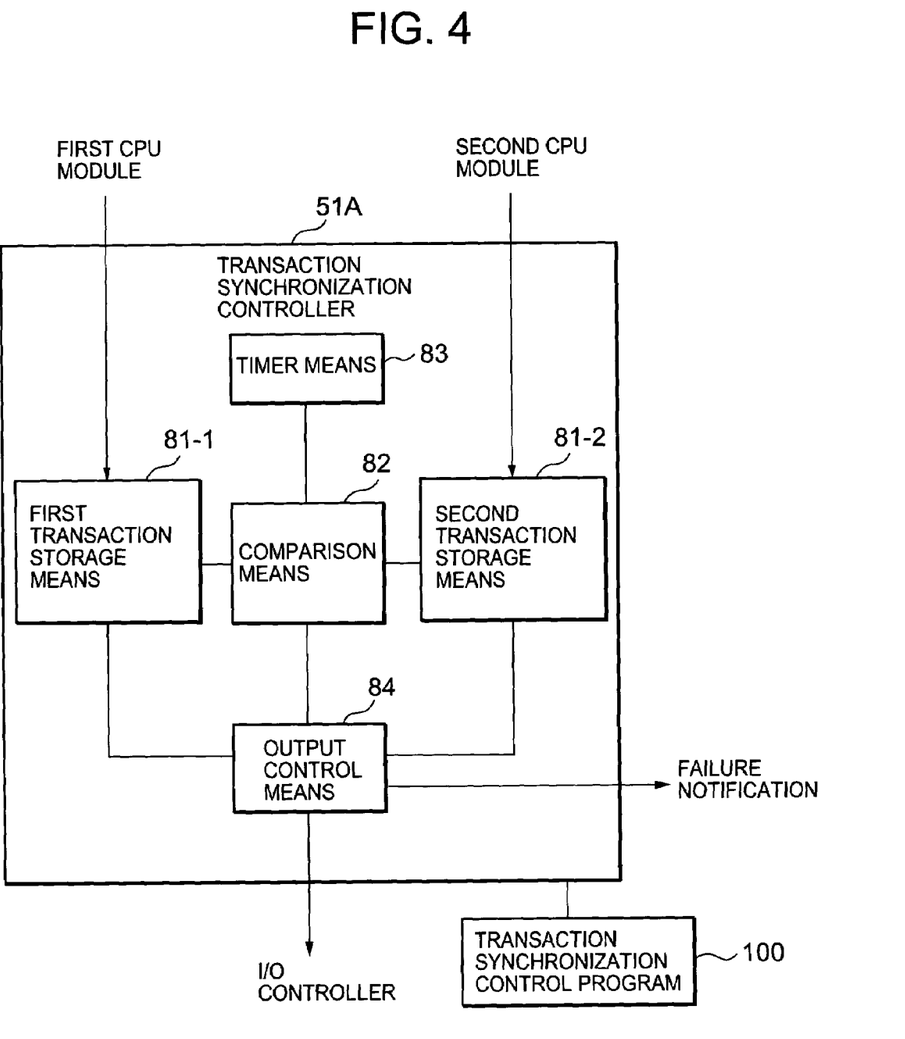
FIG. 4 is a block diagram showing an example of the configuration of a transaction synchronization controller provided in the fault tolerant computer in the embodiment of the present invention.

FIG. 4 shows an example of the configuration of the transaction synchronization controller 51A. Although the transaction synchronization controller 51A is shown, the other transaction synchronization controllers also have the same configuration.

As shown in the figure, the transaction synchronization controller 51A comprises first transaction storage means 81-1 and second transaction storage means 81-2 for storing I/O transactions issued from the first CPU module 20 and the second CPU module 30 to the I/O controller 52A respectively; comparison means 82 for comparing the sequences of I/O transactions in the first and second transaction storage means 81-1 and 81-2 to check if the sequences match; timer means 83 for measuring the elapse of a predetermined time; and output control means 84 for outputting I/O transactions to the I/O controller when the comparison means 82 determine that the sequences of I/O transactions match. When an I/O transaction sequence match is not found even after the predetermined time measured by the timer means 83 has elapsed, the output control means 84 notifies a failure monitor that a failure has occurred. A time set up by the timer means 83 for waiting is set to the time required for about 10 hardware sequences or, at the longest, 100 to 1000 sequences, of PCI-BUS I/O. For example, one hardware sequence requires about 1 microsecond, the time is set to about 10 microseconds or, at the longest, 100 microseconds to 1 milliseconds.

The example of the configuration of the transaction synchronization controller shown in FIG. 4 is only an example. The configuration is not limited to the one shown in the figure.

Figure 5:
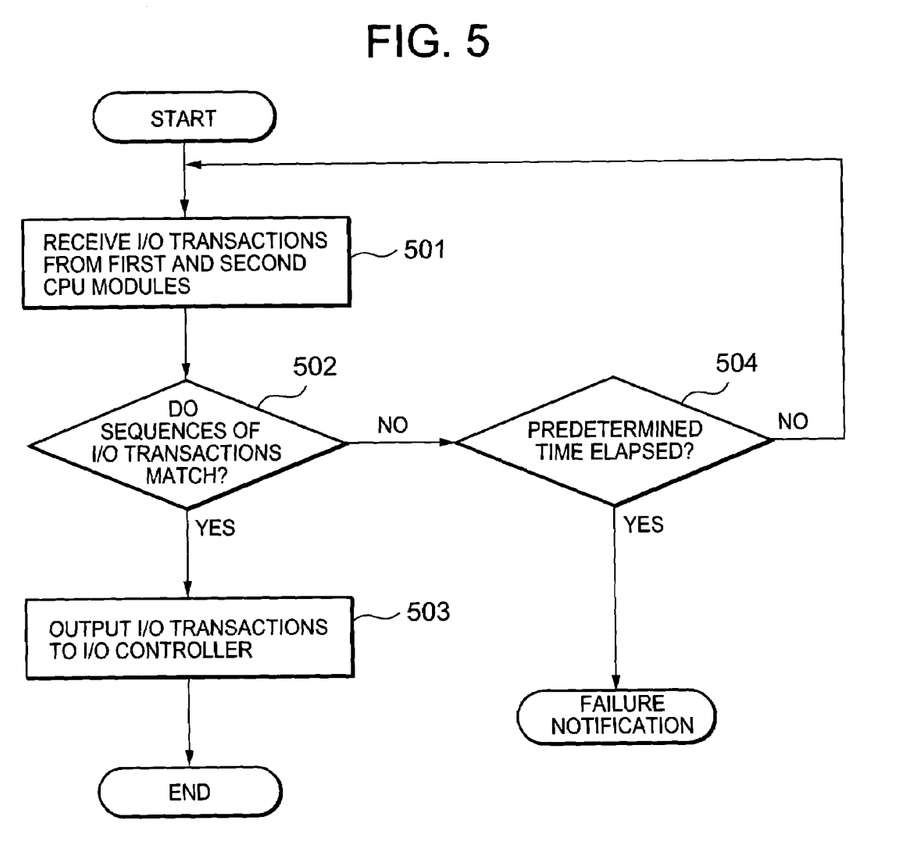
FIG. 5 is a flowchart showing an example of operation of the transaction synchronization controller provided in the fault tolerant computer in the embodiment of the present invention.

FIG. 5 is a flowchart showing the contents of operation executed by the transaction synchronization controller. First, the controller receives I/O transactions, each including a command indicating a device destination, from the first CPU module 20 and the second CPU module 30, checks this command to see if the I/O transactions are addressed to this controller, and stores the I/O transactions in the corresponding transaction storage means only when they are required (step 501). The controller checks if the sequence of the I/O transactions from the first CPU module matches the sequence of the I/O transactions from the second CPU module (step 502). At this time, the I/O transactions are sent sequentially from the transaction storage means to the comparison means 82 for comparison, one at a time. If the corresponding I/O transactions match, the next corresponding I/O transactions stored in the transaction storage means are sent to the comparison means 82 for comparison. This processing is repeated.

If all I/O transactions match, the received transactions are output to the I/O controller assuming that the sequences match (step 503).

If it is found in step 502 that an I/O transaction is received only from one of the CPU modules and therefore the sequences of I/O transactions do not match, the controller checks if a predetermined time has elapsed after the I/O transaction was received from one of the CPU modules (step 504). If the predetermined time is not yet elapsed, the controller waits for the I/O transaction to be received. That is, the controller passes control back to step 501 and repeats the comparison of the sequences of I/O transactions until the predetermined time elapses. If the predetermined time has elapsed, the controller notifies the failure monitor provided in the fault tolerant computer that a failure has occurred. If the I/O transaction is received from the other CPU module before the predetermined time elapses and therefore the sequences match, the controller outputs the received I/O transactions to the I/O controller in step 503. If it is found in step 502 that all I/O transactions have been received from each of both CPU modules but that the received sequences do not match, the controller repeats steps 504, 501, and 502 and, after the predetermined time elapses, the controller notifies the failure monitor that a failure has occurred.

Figure 2:
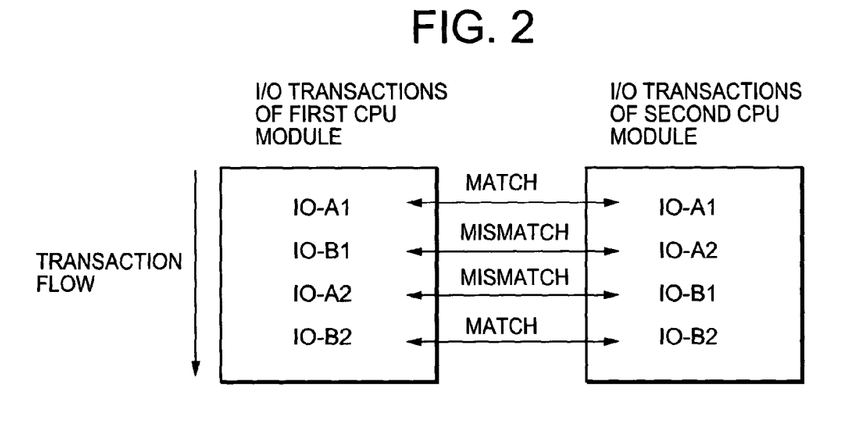
FIG. 2 is a diagram showing an example of I/O transactions issued from the CPU modules in the fault tolerant computer in the embodiment of the present invention.
Figure 3:
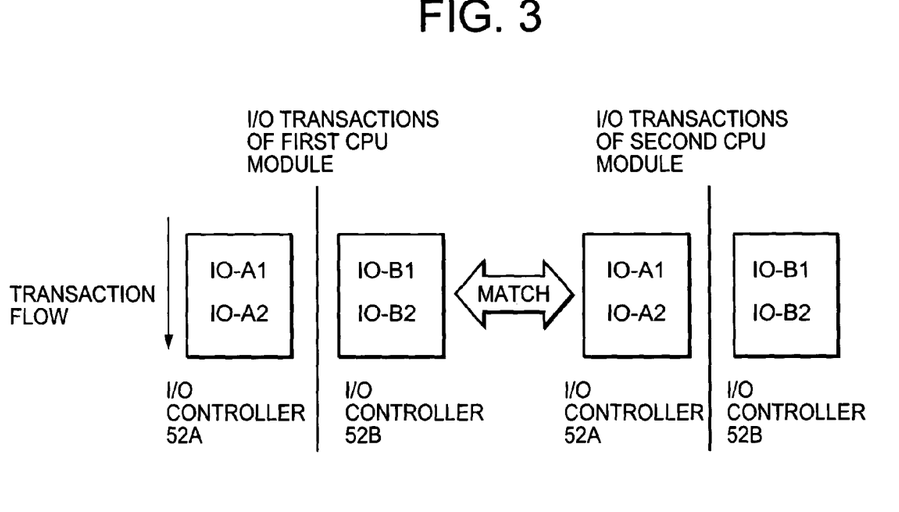
FIG. 3 is a diagram showing an example of detailed operation executed by the fault tolerant computer in the embodiment of the present invention.

Next, referring to FIGS. 1, 2, and 3, the following describes, with the use of an example, how I/O transactions are issued from the first and second CPU modules 20 and 30, what check is made in the first and second I/O modules 50 and 60, and how I/O transactions are processed.

Assume that, when the processors are out of synchronization, I/O transactions are issued from the first CPU module 20 to the first I/O module 50 in order of an I/O transaction (IO-A1), I/O transaction (IO-B1), I/O transaction (IO-A2), and I/O transaction (IO-B2).

Also assume that the I/O transactions (IO-A1) and (IO-A2) are issued to the I/O controller 52A and that I/O transactions (IO-B1) and (IO-B2) are issued to the I/O controller 52B.

On the other hand, assume that, I/O transactions are issued from the second CPU module 30 to the first I/O module 50 in order of the I/O transaction (IO-A1), I/O transaction (IO-A2), I/O transaction (IO-B1), and I/O transaction (IO-B2).

As shown in FIG. 2, the comparison of those I/O transactions indicates that, out of the I/O transactions issued from the first and second CPU modules 20 and 30 to the first and second I/O modules 50 and 60, the order of I/O transactions (IO-B1) and (IO-A2) is reversed and those two I/O transactions mismatch.

Even if a condition occurs in which there is a difference in the I/O transactions received at the same time period and the fallback or re-installation operation must be executed for one of the CPU modules, the first I/O module 50 has the transaction synchronization controllers 51A and 51B that check the sequence (order) of the I/O transactions received by each I/O controller. This configuration allows the first I/O module 50 to recognize the same I/O transaction, received at different times, as the same I/O transaction to continue processing.

For example, when the I/O transactions sent to the I/O controller 52A are represented by IO-Ax and the I/O transactions sent to the I/O controller 52B are represented by I/O-Bx, the transaction synchronization controller 51A identifies that the same I/O transactions, (IO-A1)–(IO-A2), are issued from the first and second CPU modules, as shown in FIG. 3. Similarly, the transaction synchronization controller 51B identifies that the same I/O transactions, (IO-B1)–(IO-B2), are issued from the first and second CPU modules.

In this case, because there is a high probability of a time difference between the I/O transactions from the first CPU module 20 and the I/O transactions from the second CPU module 30, the transaction synchronization controllers 51A and 51B check only the sequence sent to each I/O controller but not the time the I/O transactions arrive. That is, the transaction synchronization controllers 51A and 51B wait for a predetermined time for the same I/O transactions to be sent from the first CPU module 20 and the second CPU module 30 respectively and then outputs the I/O transactions to the I/O controllers 52A and 52B.

Take the I/O controller 52A for example. First, the same I/O transaction (IO-A1) is issued from the first CPU module 20 and the second CPU module 30 at the first time step. At the next time step, (IO-A2) arrives from the second CPU module 30 but not from the first CPU module 20. The transaction synchronization controller 51A corresponding to the I/O controller 52A waits for a predetermined time until the I/O transaction (IO-A2) is received from the first CPU module 20 (does not output but holds I/O transactions (IO-A1) and (IO-A2)). When the I/O transaction (IO-A2) arrives from the first CPU module 20 at the next time step, the transaction synchronization controller 51A determines that the sequences of I/O transactions match and outputs the I/O transactions (IO-A1) and (IO-A2) to the I/O controller 52A.

If the comparison executed by the transaction synchronization controllers 51A, 51B, 61A, and 61B indicates that the sequences of the I/O transactions from the first and second CPU modules 20 and 30 to the I/O controllers differ each other, it is also possible that the occurrence of a failure may be notified to the failure monitor in the fault tolerant computer.

The function of the means executed by the transaction synchronization controller of the fault tolerant computer according to the present invention may be executed not only by hardware but also by software by loading a transaction control program 100, which executes the function of the above-described means, into the processor (CPU) in the I/O controller and so on for execution. The transaction control program 100, stored in a recording medium such as a magnetic disk or a semiconductor memory, is loaded from the recording medium into the memory of the CPU and executed in the CPU for implementing the functions described above.

Next, a modification of the transaction synchronization controller according to the present invention will be described. In the example described above, if the same I/O transaction (IO-A1) is issued from the first CPU module 20 and the second CPU module 30 and if the I/O transaction (IO-A2) issued by the second CPU module 30 arrives but the I/O transaction (IO-A2) issued by the first CPU module 20 does not arrive, the I/O transactions (IO-A1) and (IO-A2) are not output but held. This modification differs from the example in FIG. 5 in that an I/O transaction, for which a match occurs between the two CPU modules, is output immediately to the I/O controller.

Figure 6:
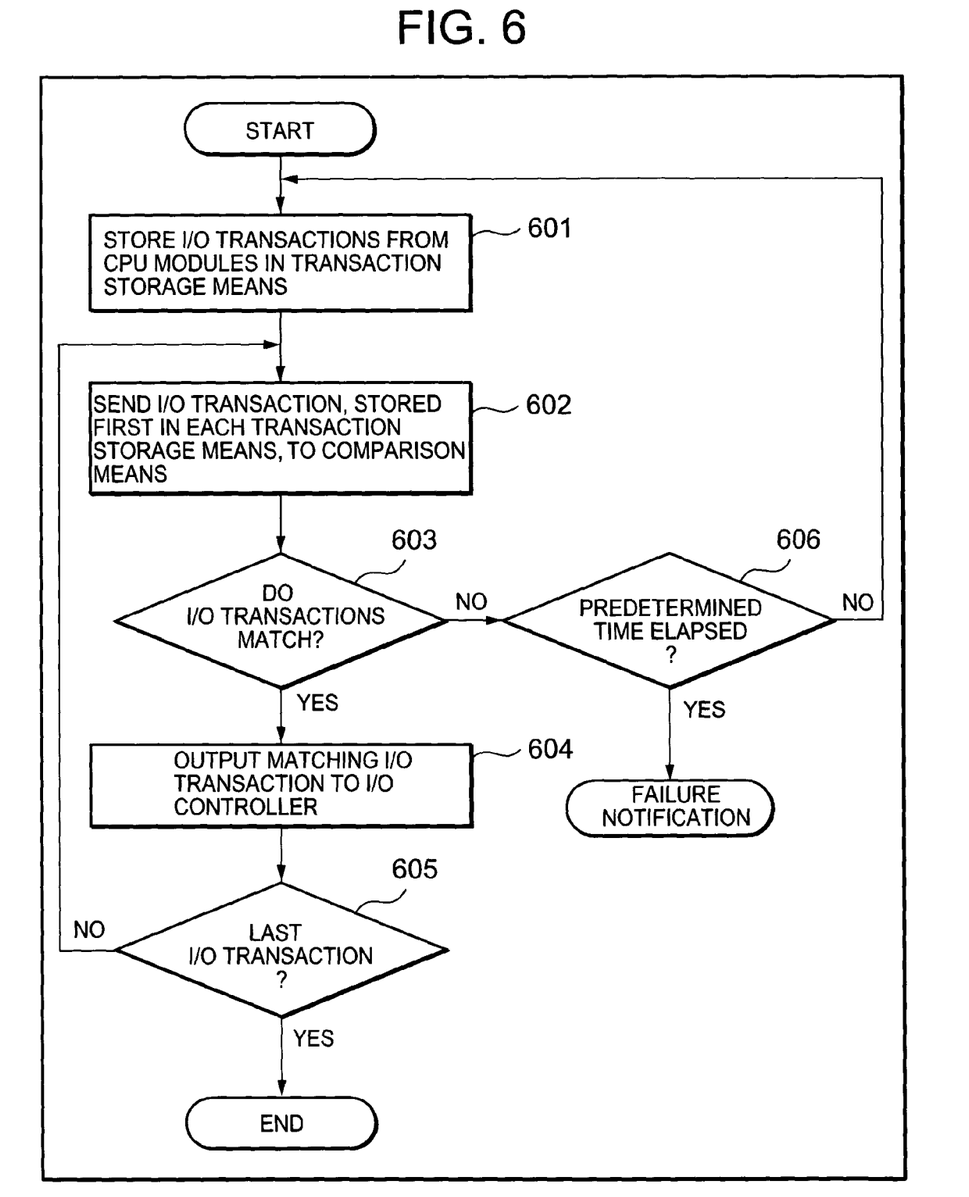
FIG. 6 is a flowchart showing an example of operation of a modification of the transaction synchronization controller.

FIG. 6 is a flowchart showing an example of operation of the transaction synchronization controller in this modification. First, the I/O transactions are received from the first CPU module 20 and the second CPU module 30 and stored in the corresponding transaction storage means (step 601). The I/O transactions, each stored in the transaction storage means first, are sent to the comparison means 82 (step 602). At this time, if no effective I/O transaction is stored, no I/O transaction is sent from the transaction storage means to the fault tolerant computer 10.

Comparison is made in the comparison means 82 that contains at most one I/O transaction read from each of the transaction storage means (step 603). If the comparison indicates that the I/O transactions match, the matching I/O transaction is output immediately to the I/O controller (step 604). At this time, the I/O transaction that has been output is erased from both transaction storage means. A check is made if the I/O transaction is the last one (step 605). If it is not the last one, control is passed back to step 602 and the next I/O transactions are sent to the comparison means 82 for comparison.

If the I/O transactions do not match in step 603, for example, if the I/O transaction is received only from one of the CPU modules and therefore the sequences of I/O transactions do not match, a check is made if a predetermined time has elapsed since the I/O transaction was received from one of the CPU modules (step 606).

If the predetermined time has not yet elapsed, control is passed back to step 601. A new I/O transaction, if received from the CPU modules, is stored in the corresponding transaction storage means for use in comparison again between the I/O transactions each of which was stored in each transaction storage means first. This processing is repeated until the predetermined time elapses. When it is found in step 606 that the predetermined time has elapsed, the controller notifies the failure monitor in the fault tolerant computer that a failure has occurred.

If an I/O transaction is received from the other CPU module before the predetermined time elapses and the I/O transactions match, a match is found in step 603 and the matching I/O transaction is output to the I/O controller in step 604. If I/O transactions are received from both CPU modules in step 603 but the received sequences do not match, steps 606, 601, and 602 are repeated and, after the predetermined time has elapsed, the controller notifies the failure monitor that a failure has occurred.

The transaction synchronization controller may have a configuration in which a plurality of timer means are provided and the first and second transaction storage means each have a capacity capable of storing a plurality of I/O transactions. This configuration allows an I/O transaction to be received continuously from the same CPU module before an I/O transaction is received from the other CPU module so that a plurality of transactions are put in the wait state.

When an I/O transaction is received from the same CPU module continuously while waiting for an I/O transaction from the other CPU module, timer means other than the one already started is started and the I/O transaction received immediately before is stored at an address different from the address where a previously-received I/O transaction is already stored. This configuration allows the controller to wait for a plurality of transactions and to check if the I/O transactions from the CPU modules match.

The following describes how the sequences of I/O transactions shown in FIGS. 2 and 3 are processed in this modification. First, when the same I/O transaction (IO-A1) is issued from the first CPU module 20 and the second CPU module 30, the I/O transactions are compared in this time step. Judging that they match, the I/O transaction (IO-A1) is output to the I/O controller 52A. In the next time step, the I/O transaction (IO-A2) is received from the second CPU module 30 but not from the first CPU module 20.

The transaction synchronization controller 51A corresponding to the I/O controller 52A stores (IO-A2), received from the second CPU module 30, in the second transaction storage means 81-2 and waits for the predetermined time until the I/O transaction (IO-A2) is received from the first CPU module 20. When the I/O transaction (IO-A2) is received from the first CPU module 20, the controller compares I/O transaction from the first CPU module 20 with the I/O transaction stored in the second transaction storage means 81-2. If they match, the controller output the I/O transaction (IO-A2) to the I/O controller 52A.

Figure 7:
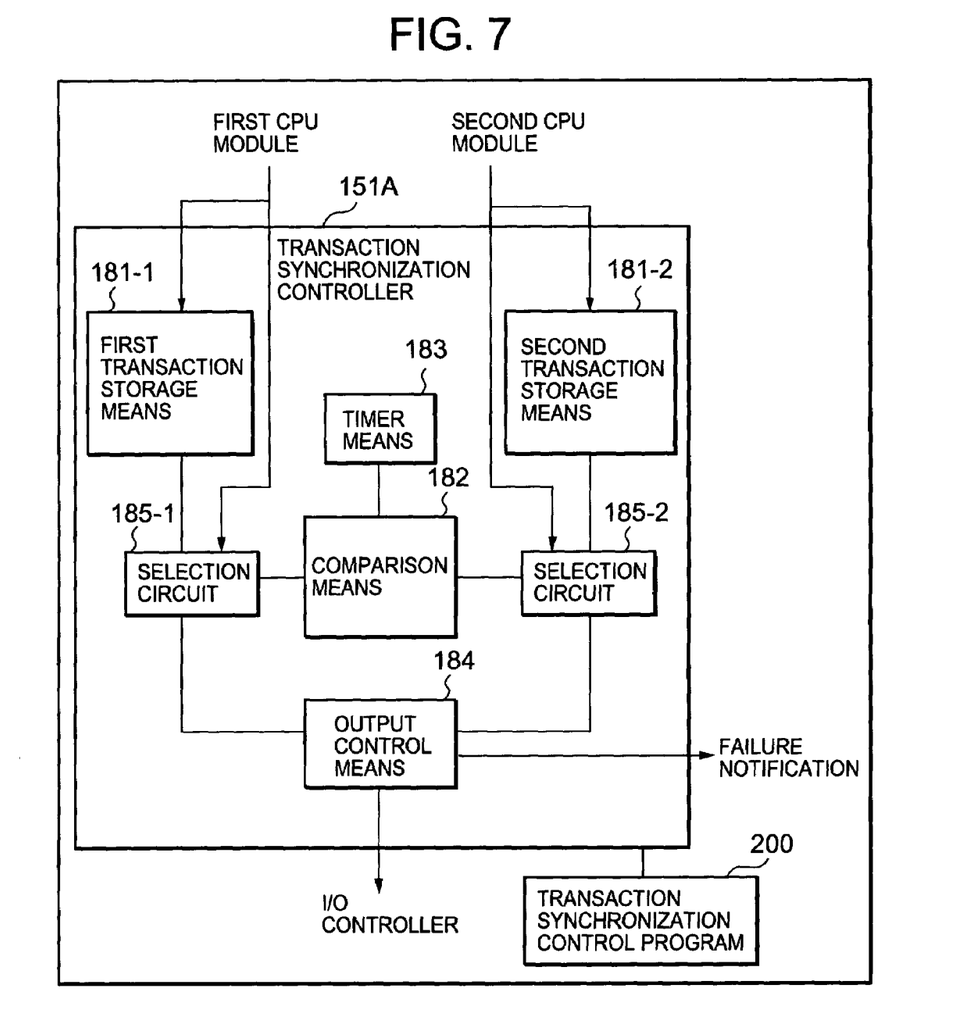
FIG. 7 is a block diagram showing the configuration of another modification of the transaction synchronization controller.

Next, another modification of the transaction synchronization controller of the present invention will be described. FIG. 7 is a block diagram showing the configuration of another modification of the transaction synchronization controller of the present invention. In this modification, the first and second CPU modules 20 and 30 are connected directly to comparison means 182. In addition, first and second selection circuits 185-1 and 185-2 are provided to select from which source the I/O transactions are received; first and second CPU modules 20 and 30 or first and second transaction storage means 181-1 and 181-2.

Figure 8:
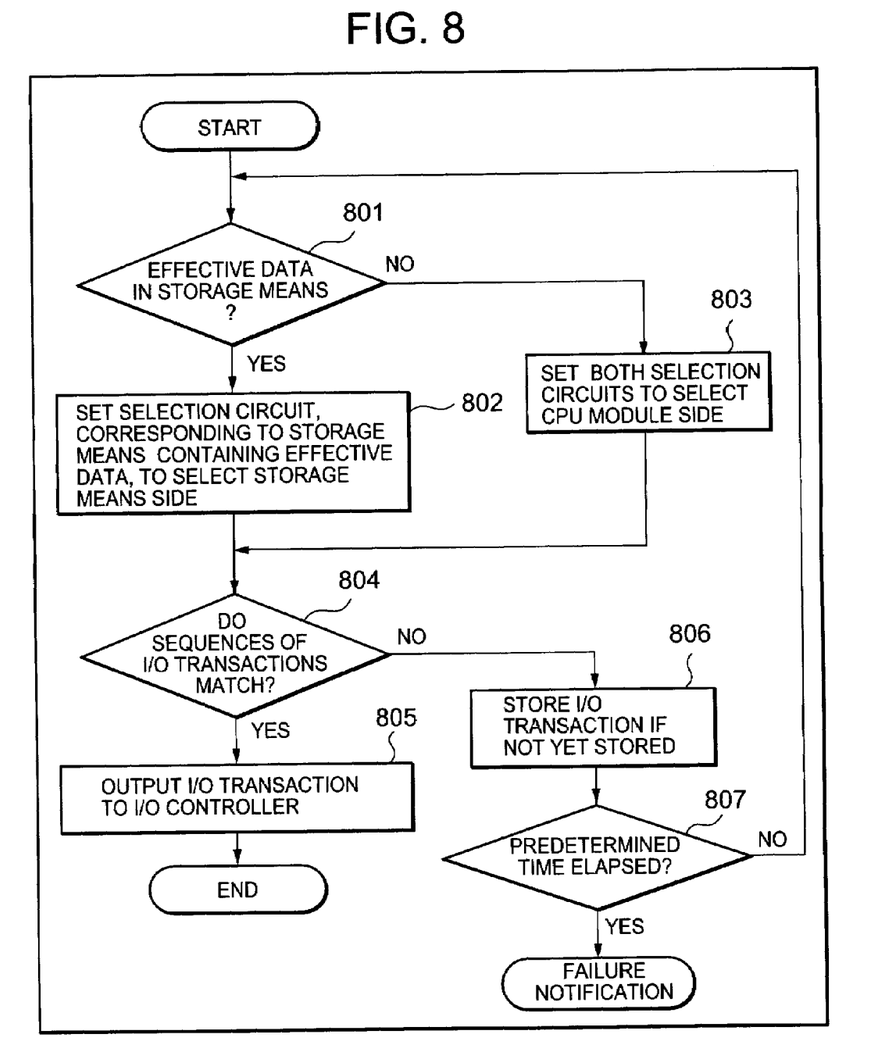
FIG. 8 is a flowchart showing an example of operation in FIG. 7.

FIG. 8 is a flowchart showing an example of operation executed in FIG. 7. First, before sending a new I/O transaction to the comparison means, a check is made whether effective data is stored in the transaction means (step 801). If effective data is stored, the corresponding selection circuit is switched to the transaction storage means side (step 802); if effective data is not stored, the selection circuit is set to the CPU module side (step 802). Therefore, in a normal state in which the storage means do not contain unprocessed I/O transactions and, at the same time, I/O transactions are received from the CPU modules, the I/O transactions are not stored in the storage means but sent directly to the comparison means 182.

A check is made if the sequences of I/O transactions match (step 804). If a match is found in the I/O transactions sent to the comparison means 182, the matching I/O transaction is output to the I/O controller (step 805).

If the I/O transactions do not match in step 804, the I/O transaction has been received only from one of the CPU modules and the I/O transaction, if not yet stored in the transaction storage means, is stored (step 806). If the sequences of I/O transactions do not match, a check is made if the predetermined time has elapsed since the I/O transaction was received from one of the CPU module (step 807).

If the predetermined time has not yet elapsed, control is passed back to step 801 for use in comparison of the sequences of I/O transactions again. This processing is repeated until the predetermined time elapses. If the predetermined time has elapsed, the controller notifies the failure monitor provided in the fault tolerant computer that a failure has occurred. If an I/O transaction is received from the other CPU module before the predetermined time elapses and a match is found in step 804, the received I/O transaction is output to the I/O controller in step 805.

If I/O transactions are received from both CPU modules but the sequences do not match in step 804, the controller notifies the failure monitor after the predetermined time that a failure has occurred.

While the present invention has been described in conjunction with the preferred embodiments described above, it is to be understood that the present invention is not limited to the embodiment described above but may be implemented in various forms within the scope of the technological concept.

What is claimed is:

1. A fault tolerant computer comprising:
   first and second CPU (Central Processing Unit) modules processing the same instruction string while maintaining clock synchronization;
   an I/O module having a plurality of device controllers each executing input/output control processing for a device; and
   a plurality of transaction synchronization controllers, each of which is provided with corresponding one of said device controllers, checks if first and second sequences of I/O transactions addressed to said corresponding device controller issued from said first and second CPU modules, respectively, match, and determines whether out-of-synchronization occurs.

2. The fault tolerant computer according to claim 1, wherein said transaction synchronization controller comprises:
   a timer element which measures a predetermined time; and
   a comparison element which checks if said first and second sequences match while waiting for the predetermined time.

3. The fault tolerant computer according to claim 2, wherein said transaction synchronization controller further comprises an output controller that outputs said I/O transactions to said device controller when said first and second sequences match.

4. The fault tolerant computer according to claim 3, wherein, when the I/O transactions from the first and second CPU modules match, said output controller outputs the matching I/O transactions to said device controller, one at a time.

5. The fault tolerant computer according to claim 2, wherein, when the first and second sequences do not match within the predetermined time or when the first and second sequences of I/O transactions differ, said output controller outputs a failure notification.

6. The fault tolerant computer according to claim 2, wherein said transaction synchronization controller further comprises first and second storage elements in which the I/O transactions issued from said first and second CPU modules are stored.

7. The fault tolerant computer according to claim 6, wherein said transaction synchronization controller further comprises selection circuits which select between said first storage element and said first CPU module and which select between said second storage element and said second CPU module as a source from which I/O transactions to be sent to said comparison element are received.

8. A transaction synchronization control method for use in a fault tolerant computer, said method comprising:
   sending a plurality of, and the same, I/O transactions from first and second CPU modules, which process the same instruction string while maintaining clock synchronization, to a plurality of device controllers in an I/O module; and
   checking if first and second sequences of I/O transactions addressed to said device controller issued from said first and second CPU modules, respectively, match and determining whether out-of synchronization occurs.

9. The transaction synchronization control method according to claim 8, wherein said checking step checks if said first and second sequences of I/O transactions match while waiting for a predetermined time.

10. The transaction synchronization control method according to claim 9, further comprising outputting the I/O transactions to said device controller when said first and second sequences match.

11. The transaction synchronization control method according to claim 9, wherein, for each device controller, said sending step stores the I/O transactions issued from said first and second CPU modules into first and second storage elements, respectively and
    wherein said checking step sends the I/O transactions, stored in said first and second storage elements, to comparison element which checks if said first and second sequences match, checks if the predetermined time has elapsed if said first and second sequences do not match, and determines that an out-of-synchronization condition is not caused if the predetermined time has not yet elapsed.

12. The transaction synchronization control method according to claim 11, wherein, when the received I/O transactions match, the matching I/O transactions are output to said device controller, one at a time.

13. The transaction synchronization control method according to claim 9, further comprising outputting a failure notification when said first and second sequences do not match within the predetermined time.

14. The transaction synchronization control method according to claim 11, further comprising selecting between said storage element and said first CPU module and selecting between said second storage element and said second CPU model, as a source when a new I/O transaction is sent to said comparison element.

15. The transaction synchronization control method according to claim 14, wherein, when said first and second storage elements do not contain effective data, said selecting step switches the source to first and second CPU modules, respectively.

16. A computer program product having a computer readable medium with computer readable program code stored thereon, said computer readable code comprising the steps of:
    sending a plurality of, and the same, I/O transactions from first and second CPU modules to a plurality of device controller in an I/O module; and
    checking if first and second sequences of I/O transactions addressed to said device controller issued from said first and second CPU modules, respectively, match and determining whether out-of-synchronization occurs.

17. The program product according to claim 16, wherein said checking step checks if said first and second sequences of I/O transactions match while waiting for a predetermined time.

18. The computer program product according to claim 17, further comprising outputting the I/O transactions to said device controller when said first and second sequences match.

19. The computer program product according to claim 16, further comprising outputting a failure notification when said first and second sequences do not match within the predetermined time or when first and second sequences of I/0 transactions differ.

20. The computer program product according to claim 17, wherein, for each device controller, said sending step comprises storing the I/O transactions, issued from said first and second CPU modules, into first and second storage elements, respectively and
    wherein said checking step comprises sending the I/O transactions stored in said first and second storage element to comparison element which checks if said first and second sequences match and comparing the I/O transactions; checking if the predetermined time has elapsed if said first and second sequences do not match; and determining that an out-of-synchronization condition is not caused when the predetermined time has not yet elapsed.

* * * * *